United States Patent Office 2,977,348
Patented Mar. 28, 1961

2,977,348

VULCANIZATION OF BUTYL RUBBER WITH 2,2'-METHYLENE - BIS-(4-NITRO-6-ACETOXYMETHYLPHENOL) OR 2,6-BIS-(ACETOXYMETHYL)-4-NITROPHENOL

Pliny O. Tawney, Passaic, George H. Brice, Glen Rock, and Paul Viohl, Ramsey, N.J., assignors to United States Rubber Company, New York, N.Y., a corporation of New Jersey No Drawing. Filed Oct. 7, 1958, Ser. No. 765,740

12 Claims. (Cl. 260—85.3)

This invention relates to a new method of vulcanizing butyl rubber, namely with certain nitrophenols having the following structural formula:

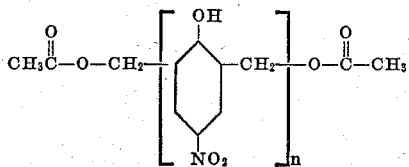

where "$n$" is an integer having a value of either one or two. Specifically, the vulcanizing agents employed are 2,6-bis-(acetoxymethyl)-4-nitrophenol [i.e. the compound when $n=1$], and 2,2'-methylene-bis-(4-nitro-6-acetoxymethylphenol) [i.e., the compound wherein $n=2$], the latter being preferred.

It has now been found, unexpectedly, that butyl rubber can be cured or vulcanized to yield a vulcanizate having an unusual combination of desirable properties by heating the butyl rubber in admixture with the aforesaid nitrophenols. The vulcanizates of the invention are remarkable for the "tightness" of cure, obtainable in a relatively short curing time under relatively moderate curing conditions (especially with the preferred curing agent, corresponding to the above formula when $n=2$), as well as for the remarkable resistance of the vulcanizates to deterioration on aging, under the influence of such destructive agencies as heat, steam, oxygen and ozone.

The term "butyl rubber" is used herein in its conventional sense to refer to that known class of synthetic rubbers typically made by low temperature copolymerization of an isoolefin with a minor amount of a multiolefinic unsaturate. The isoolefins used generally have from 4 to 7 carbon atoms, and such isomonoolefins as isobutylene and 2-methyl-2-butene are preferred. The multiolefinic unsaturate is generally a conjugated diolefin, usually one having from 4 to 8 carbon atoms. Isoprene and butadiene are the most important of these diolefins; others are piperylene, 2,3-dimethylbutadiene, 3-methyl-1,3-pentadiene, 2-methyl-1,3-pentadiene, 1,3-hexadiene and 2,4-hexadiene. The butyl rubber usually contains from about 0.5 to 10% of copolymerized diolefin. The basic copolymer may be modified, if desired, either by including other copolymerizable materials in the original preparation of the copolymer, or by treating the previously prepared copolymer with reactive reagents. Thus, the rubbery copolymer of an isoolefin, such as isobutylene, containing 0.5 to 10% of copolymerized diolefin, such as isoprene, may be modified by replacing more or less of the non-chlorinated diolefin (e.g., isoprene) by a chlorinated diolefin (e.g., chloroprene), or the non-chlorinated diolefin may be supplemented by chlorinated diolefin, in the preparation of the copolymer. Similarly, other modifying monomers, such as allyl chloride or methallyl chloride, may be present during the preparation of the copolymer. The final copolymer usually contains from 0.5 to 10% of the diolefinically unsaturated material, but the content of isoolefin may vary from 80 to 99.5%, depending on whether additional monomers are present. If there is no additional modifying comonomer present, the isoolefin content usually amounts to from 90 to 99.5%. Alternatively, the copolymer may be modified by subjecting the previously prepared copolymer to the action of halogens, usually chlorine or bromine, to produce a modified copolymer containing, for example, 0.2 to 10% of chlorine or bromine (see, for example, U.S. Patents No. 2,732,354, dated January 24, 1956, to Richard T. Morrissey and Marvin R. Frederick; No. 2,631,984, dated March 17, 1953, to Richard A. Crawford and Richard T. Morrissey; No. 2,700,997, dated February 1, 1955, to Richard T. Morrissey and Henry J. Weiss; and No. 2,720,479, dated October 11, 1955, to Richard A. Crawford and Richard T. Morrissey). Examples of commercially available rubbery copolymers of an isoolefin with 0.5 to 10% of a diolefin include "GR–I 15," "Enjay Butyl B-11" (the latter being a modified copolymer containing chlorine) and "Hycar 2202" (the latter being a modified copolymer containing bromine). Hence, the expressions "butyl rubber," or "rubbery copolymer of an isoolefin with from 0.5 to 10% of a diolefin," or similar expressions, as used herein, therefore contemplate the various known modified forms of the butyl rubber copolymer, as well as the unmodified copolymer.

Butyl rubber differs markedly, in its behavior toward vulcanizing agents, from the typically highly unsaturated rubbers, such as Hevea rubber or such synthetic rubbers as GR–S (butadiene-styrene copolymer) or GR–A (butadiene-acrylonitrile copolymer), which are in general much more readily vulcanizable. The vulcanization of butyl rubber has always presented a special problem, and although it is possible to vulcanize butyl rubber with sulfur and conventional accelerators, such sulfur vulcanization has not been entirely satisfactory for many purposes, and hence the continuing search for improved ways of curing butyl rubber.

Preparation of the present nitrophenol curative for butyl rubber follows conventional practice, as shown by the following preparations of the preferred curative, 2,2'-methylene-bis - (4-nitro-6-acetoxymethylphenol), and of the less preferred curative, 2,6-bis-(acetoxymethyl)-4-nitrophenol. In these preparations, all parts and percentages are expressed by weight.

PREPARATION OF 2,2'-METHYLENE-BIS-(4-NITRO-6-ACETOXYMETHYLPHENOL)

2,2' - methylene - bis-(4-nitro-6-acetoxymethylphenol) can be made in three steps from 4-nitrophenol. The first step, to form 8,8'-methylene-bis-(6-nitro-1,3-benzodioxan), called "di-(6-nitrobenzdioxinyl-8) methane" in the literature, is described by Chattaway in Journal Chemical Society 699 (1933). The two subsequent steps are carried out as follows;

8,8'-methylene - bis - (6-nitro-1,3-benzodioxan) (140 parts) and a solution of hydrogen bromide in acetic acid (270 parts of 30% HBr) are heated together at reflux temperature for 4 hours. During this time hydrogen bromide is bubbled through the mixture and trapped by condensed acetic acid. The solid, which never goes into solution, gradually changes from a buff-colored material to a fine, white powder which is 2,2'-methylene-bis-(4-nitro-6-bromomethylphenol). It is filtered from the cooled solution, washed with water and air-dried. The yield is 75-90% of theory; melting point 250-255° C. with decomposition.

Powdered 2,2'-methylene-bis-(4-nitro-6-bromomethylphenol) (130 parts) is mixed well with powdered sodium acetate (50 parts), and then acetic acid (105 parts) is added. The mixture is heated on the steam bath for an hour, and then the clear solution is poured onto ice to precipitate 2,2'-methylene-bis-(4-nitro-6-acetoxymethylphenol) as a yellow powder. It is filtered, washed with water, and recrystallized from ethanol. The yield of recrystallized 2,2'-methylene-bis-(4-nitro-6-acetoxymethylphenol) melting at 153-154° C., is 152 parts, or 95% of theory.

Analysis:

|  | Calculated, percent | Found, percent |
| --- | --- | --- |
| Carbon | 52.90 | 53.01 |
| Hydrogen | 4.17 | 4.38 |
| Nitrogen | 6.50 | 6.31 |

PREPARATION OF 2,6-BIS-(ACETOXYMETHYL)-4-NITROPHENOL 2,6-bis-(acetoxymethyl)-4-nitrophenol may be made in three steps from 4-nitrophenol. All parts and percentages are by weight. The first step, to form 6-nitro-8-chloromethyl-1,3-benzodioxan is carried out as follows:

Paraformaldehyde (90 parts) is added gradually with stirring at 70–90° C. to a mixture of 70 parts of 4-nitrophenol, 158 parts of acetic acid, 165 parts of concentrated hydrochloric acid (36% assay), 118 parts of 85% phosphoric acid, and 9 parts of 96% sulfuric acid. The stirred mixture is heated at 100° for several hours, and then is poured into ice water to precipitate the product, 6-nitro-8-chloromethyl-1,3-benzodioxan, as a light yellow, crystalline solid. After recrystallization from ethanol it melts at 104-5° C.

| Analysis | C, percent | H, percent | N, percent | Cl, percent |
| --- | --- | --- | --- | --- |
| Calcd. for $C_9H_8O_4NCl$ | 47.2 | 3.5 | 6.1 | 15.3 |
| Found | 46.9 | 3.3 | 6.0 | 14.4 |

In the second step, 6-nitro-8-chloromethyl-1,3-benzodioxan (22.9 parts) is added to a solution of 32 parts of hydrogen bromide in 93 parts of acetic acid. The mixture is refluxed for a few hours until the solid has gone into solution. Then the solution is poured into ice to precipitate 2,6-bis-bromomethyl-4-nitrophenol, a white, crystalline solid. After two recrystallizations from benzene it melts at 150-1°. The yield is 30.8 parts, or 95% of theory.

In the third step, a mixture of 25 parts of 2,6-bis-bromomethyl-4-nitrophenol, about 15 parts of anhydrous sodium acetate, and 105 parts of acetic acid is heated on a steam bath for an hour, and then filtered. The filtrate is poured onto ice to precipitate 2,6-bis-(acetoxymethyl)-4-nitrophenol, a light yellow, crystalline solid. After recrystallization from ethanol it melts at 127-8°. The yield is substantially quantitative.

| Analysis | C, percent | H, percent | N, percent |
| --- | --- | --- | --- |
| Calcd. for $C_{12}H_{13}O_7N$ | 50.9 | 4.6 | 4.95 |
| Found | 51.8 | 4.9 | 5.37 |

In accordance with the invention, the butyl rubber (in which category I include all of the unmodified or modified isoolefin-diolefin copolymers referred to above) is mixed in any suitable conventional manner (such as by working the rubber on an open roll mill or in an internal mixer) with a small but effective amount of the nitrophenol of the class defined, sufficient to produce the desired level of cure. The desired level of cure may range all the way from a slight precure (as disclosed, for example, in U.S. Patents Nos. 2,702,286 and 2,702,287, dated February 15, 1955, to Alfred N. Iknayan, Lester C. Peterson and Harvey J. Batts, or U.S. Patent No. 2,756,801, dated July 31, 1956, to Alfred N. Iknayan, Lester C. Peterson and Harvey J. Batts) to a complete or true vulcanization. The slight pre-cure may be carried out for various purposes, such as to improve processing or to improve the dispersion of carbon black, silica or other fillers in the butyl rubber, or to lower the hysteresis of such butyl rubber-filler mixtures (when subsequently vulcanized), or to render the butyl rubber more compatible with oil or with other rubbers, or to provide a plastic puncture-sealing material for pneumatic tires or tubes, all as disclosed in the patents just referred to. Such slight precure can be effected with very small amounts of the curing agent of the invention, usually less than 2 parts by weight (e.g., about 0.25 to about 1.9 parts) per 100 parts of the butyl rubber.

It will be understood that such slight pre-cure, or "scorching," is accomplished by heating the mixture of butyl rubber and the present curing agent in the amount specified, along with any other desired ingredients, to a temperature sufficient to cause reaction (viz., slight vulcanization) between the butyl rubber and the present curing agent. Temperatures ranging from about 125° C. to about 200° C. are usually suitable, and it is frequently preferred to masticate the mixture during such pre-cure. This treatment may require some 2 to 15 minutes with mastication, or up to 8 hours without mastication, depending on such variable as the concentration of the treating agent and the temperature of the treatment. Subsequently, the pre-cured mix may be completely vulcanized if desired, using either a further quantity of the vulcanizing agent of the invention, or any conventional vulcanizing agent for butyl rubber (e.g., sulfur and/or sulfur-donating accelerators, dinitrosobenzene, quinone dioxime, dimethylol-phenols, etc.), usually in amount of from 2 to 15 parts.

The more typical practice of the invention involves the substantially complete cure of the butyl rubber by the present chemical curatives to yield directly a strong, elastic, and resilient body useful for curing bags, steam hose, conveyor belts, pneumatic tires, rubber mountings, fuel cells, protective clothing, and similar articles. For this purpose there is employed at least about 2 parts of the present curing agent per 100 parts of butyl rubber, usually from about 2 parts to about 15 parts, and preferably from about 4 parts to about 12 parts. The vulcanization is brought about, as indicated previously, by heating the mixture, to a temperature of, for example, from about 125° C. to about 200° C. The time required to substantially complete the cure will vary widely in practice depending on such variables as the quantity of the present curing agent employed, the temperature at which the process is carried out, the size of the article being cured, the type of apparatus employed, etc. In general, it may be stated that satisfactory cures may be obtained within curing times ranging between about 2 minutes to 8 hours. It will be understood that the time required will in general be inversely related to the quantity of the present vulcanizing agent contained in the mixture, and will also be inversely related to the temperature existing during the cure.

Other modifying or compounding ingredients may be present in the mixture of butyl rubber and the present vulcanizing agent, if desired. Thus, fillers such as carbon black, clays, hydrated silica, whiting, or the like, may be present, as well as pigments and dyes, mold release agents, blowing agents, softeners or plasticizers, tackifying agents, etc.

The vulcanization may be carried out in a closed mold under suitable pressure (as, for example, in the case of pneumatic tires or curing bags), or it may be carried out in an oven in air or any other suitable atmosphere (as in the case of gloves or footwear). The vulcanizable composition may be calendered or otherwise applied to fabric (e.g., tire cord fabric) to make laminated articles such as pneumatic tires or air springs.

If desired, the vulcanization of the invention may be preceded by a slight pre-curing of the butyl rubber, for any of the purposes previously referred to, such pre-curing being effected either by the present curing agent or by any suitable conventional curing agent (e.g., sulfur or sulfur-donating accelerators, dinitrosobenzene, quinone dioxime, dimethylol phenols, etc., usually in amount of from 0.25 to 1.9 parts). The present vulcanizates, especially if the foregoing pre-cure has been carried out (and more especially if the present curing agent or a dimethylol phenol has been used in the pre-cure), are frequently characterized by unusually low hysteresis, and freedom from "sponging" (as illustrated by improved results in the St. Joe flexometer test).

The following examples, in which all parts and percentages are by weight, will serve to illustrate the practice of the invention in more detail.

*Example 1*

A masterbatch was mixed in a Banbury internal mixer in the proportion of 100 parts of commercial butyl rubber made from isobutylene and isoprene (of the kind known as GR-I-25 or IIR-325, containing about 1.9–2.5 mole percent unsaturation, or about 2.5% of isoprene), 40 parts of carbon black, and one part of "Super Beckacite 1001" (a resole made from 4-tert-butylphenol and formaldehyde in the presence of sodium hydroxide). The mixture then was masticated for 10 minutes in the Banbury at 350° F. in order to lower the hysteresis of the cured stocks to be made from the masterbatch. It then was mixed on the mill with the materials shown below. Portions of this mixture were cured in 6" x 6" x 0.1" molds under pressure at 153° C. for the times shown. The stocks were cooled to room temperature and tested conventionally, as shown, to determine the extent of cure. The tensile strength and elongation were run on a Scott machine, and the modulus was run on an autographic stress-strain machine.

| Stock | | 1 |
|---|---|---|
| Masterbatch | | 141 |
| 2,2'-Methylene-bis-(4-nitro-6-acetoxymethylphenol) | | 8.7 |
| Paraffinic oil | | 5.0 |
| Laurex a | | 1.7 |

| | Time of Cure (Min.) | |
|---|---|---|
| Physical Properties: | | |
| Tensile strength (p.s.i.) | 15 | 1,980 |
|  | 30 | 2,060 |
|  | 60 | 1,410 |
|  | 120 | 1,390 |
| Elongation (Percent) | 15 | 490 |
|  | 30 | 430 |
|  | 60 | 280 |
|  | 120 | 250 |
| 200% Modulus (p.s.i.) | 15 | 390 |
|  | 30 | 600 |
|  | 60 | 900 |
|  | 120 | 1,130 | a Crude zinc laurate.

This example shows that 2,2'-methylene-bis-(4-nitro-6-acetoxymethylphenol) cures butyl very rapidly.

*Example 2*

The following stocks were mixed, cured and tested as shown in Example 1. A new masterbatch, made as shown in Example 1, except that it contained no Super Beckacite 1001, was used. Stocks cured for 60 minutes also were aged in circulating air at 350° F. for the times shown, and then tested at room temperature.

| Stock | 2 | 3 |
|---|---|---|
| Masterbatch | 140 | 140 |
| 2,2'-Methylene-bis-(4-nitro-6-acetoxymethylphenol) | 5.0 | |
| Super Beckacite 1001 | | 5.0 |
| Paraffinic oil | 3.5 | 3.5 |
| SnCl₂.2H₂O (accelerator) | | 1.8 |

A. GREEN TESTS

| | Time of Cure (min.) | | |
|---|---|---|---|
| Physical Properties: | | | |
| Tensile strength (p.s.i.) | 15 | 750 | 1,470 |
|  | 30 | 1,310 | 1,810 |
|  | 60 | 1,340 | 1,890 |
|  | 120 | 1,230 | 1,980 |
| Elongation (Percent) | 15 | 620 | 610 |
|  | 30 | 520 | 560 |
|  | 60 | 440 | 510 |
|  | 120 | 350 | 470 |
| 300% Modulus (p.s.i.) | 15 | 320 | 410 |
|  | 30 | 530 | 600 |
|  | 60 | 710 | 730 |
|  | 120 | 930 | 900 |

B. AGING TESTS
[On 60 min. cures]

| | | | |
|---|---|---|---|
| Tensile strength (p.s.i.) | 0 | 1,340 | 1,890 |
|  | 1 | 1,020 | 1,380 |
|  | 2 | 940 | 1,010 |
|  | 4 | 740 | 570 |
| Elongation (Percent) | 0 | 440 | 510 |
|  | 1 | 280 | 360 |
|  | 2 | 300 | 340 |
|  | 4 | 320 | 340 |
| 300% Modulus (p.s.i.) | 0 | 710 | 730 |
|  | 1 | *1,030 | 890 |
|  | 2 | 820 | 720 |
|  | 4 | 730 | 450 |

* Extrapolated.

This example shows that 2,2'-methylene-bis-(4-nitro-6-acetoxymethylphenol) cures butyl substantially as rapidly and tightly, without an accelerator, as Super Beckacite 1001 does when accelerated by stannous chloride. This is shown especially by the modulus. Stocks cured with 2,2'-methylene-bis-(4-nitro-6-acetoxymethylphenol) withstand aging in air even better than does the stock cured with Super Beckacite 1001. Stock #3 of course does not illustrate the present invention.

Example 2 also emphasizes that 2,2'-methylene-bis-(4-nitro-6-acetoxymethylphenol) may be used to particular advantage in curing butyl rubber adjacent to or surrounding textile material, e.g., in tires, fabric-reinforced steam hose, etc., because the cure with 2,2'-methylene-bis-(4-nitro-6-acetoxymethylphenol) proceeds with adequate speed even in the absence of an acidic accelerator which would ordinarily tenderize textile material.

*Example 3*

A masterbatch was mixed in a Banbury internal mixer in the proportion of 100 parts of commercial isobutylene-isoprene copolymer rubber, 50 parts of carbon black and 5 parts of paraffinic oil. Stocks were made by mixing on a rubber mill portions of the masterbatch with the materials shown below. Pieces of each stock were heated in 2.5" x 6" x 0.1" cavity molds under pressure at 153° C. for the times shown. The pieces were cooled to room temperature and tested conventionally, as shown to determine the extent of cure. The tensile strength and elongation were run on a Scott machine, and the modulus was run on an autographic stress-strain machine.

| Stock | 1 |
|---|---|
| Masterbatch | 141 |
| 2,2'-Methylene-bis-(4-nitro-6-acetoxymethylphenol) | 8.7 |
| Paraffinic oil | 5.0 |
| Laurex a | 1.7 |

| Physical Properties: | Time of Cure (Min.) | |
|---|---|---|
| Tensile strength (p.s.i.) | 15 | 1,980 |
|  | 30 | 2,060 |
|  | 60 | 1,410 |
|  | 120 | 1,390 |
| Elongation (Percent) | 15 | 490 |
|  | 30 | 430 |
|  | 60 | 280 |
|  | 120 | 250 |
| 200% Modulus (p.s.i.) | 15 | 390 |
|  | 30 | 600 |
|  | 60 | 900 |
|  | 120 | 1,130 | a Crude zinc laurate.

This example shows the accelerating effect of stannous chloride on the cure of butyl rubber with 2,6-bis-(acetoxymethyl)-4-nitrophenol. In general, it may be mentioned that the heavy metal chlorides (e.g. tin, iron, and zinc chlorides) are suitable for this purpose, and they are usually used in amount of from 0.5 to 5 parts, per 100 parts of butyl rubber.

Having thus described our invention, what we claim and desire to protect by Letters Patent is:

1. A method comprising heating 100 parts of a rubbery copolymer of an isoolefin having from 4 to 8 carbon atoms with a diolefin having from 4 to 8 carbon atoms, the said copolymer containing from 0.5 to 10% of said diolefin, in admixture with from 0.25 to 15 parts of a nitrophenol having the structural formula:

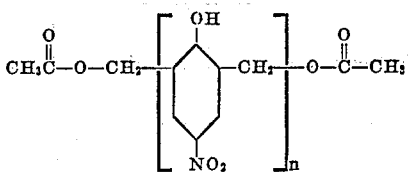

where "n" is a positive whole integer less than 3, at a temperature of from 125° to 200° C., for a period of time of from 2 minutes to 8 hours.

2. A method as in claim 1, in which the said isoolefin is isobutylene and the said diolefin is isoprene.

3. A method of vulcanizing a rubbery copolymer of an isoolefin having from 4 to 7 carbon atoms with a diolefin having from 4 to 8 carbon atoms, the said copolymer containing from 0.5 to 10% of said diolefin, comprising heating 100 parts of said copolymer in admixture with from 2 to 15 parts of a nitrophenol having the structural formula:

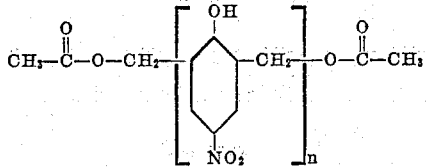

where "n" is a positive whole integer less than 3, at a temperature of from 125° to 200° C., for a period of time of from 2 minutes to 8 hours as a curing agent.

4. A method as in claim 3, in which the said isoolefin is isobutylene and the said diolefin is isoprene.

5. A method of vulcanizing a rubbery copolymer of isobutylene and isoprene, said copolymer containing from 0.5 to 10% of isoprene, comprising heating 100 parts of said rubbery copolymer in admixture with from 4 to 12 parts of 2,2'-methylene-bis-(4-nitro-6 - acetoxymethylphenol) as a curing agent at a temperature of from 125° to 200° C., for a period of time of from 2 minutes to 8 hours.

6. A method of vulcanizing a rubbery copolymer of isobutylene and isoprene, said copolymer containing from 0.5 to 10% of isoprene, comprising heating 100 parts of said rubbery copolymer in admixture with from 4 to 12 parts of 2,6-bis-(acetoxymethyl)-4-nitrophenol as a curing agent and from 0.5 to 5 parts of a heavy metal chloride as an accelerator.

7. A reaction product comprising, in chemical combination, 100 parts of a rubbery copolymer of an isoolefin having from 4 to 7 carbon atoms with a diolefin having from 4 to 8 carbon atoms, the said copolymer containing from 0.5 to 10% of said diolefin, and from 0.25 to 15 parts of a nitrophenol having the structural formula:

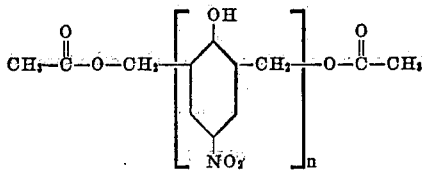

where "n" is a positive whole integer less than 3.

8. A reaction product as in claim 7 in which the said isoolefin is isobutylene and the said diolefin is isoprene.

9. A vulcanizate comprising 100 parts of a rubbery copolymer of an isoolefin having from 4 to 7 carbon atoms with a diolefin having from 4 to 8 carbon atoms, the said copolymer containing from 0.5 to 10% of said diolefin, and from 0.25 to 15 parts of a nitrophenol having the structural formula:

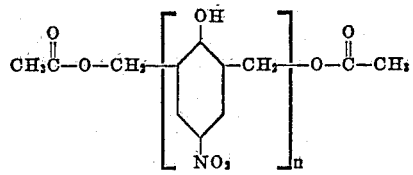

where "n" is a positive whole integer less than 3.

10. A vulcanizate as in claim 9 in which the said isoolefin is isobutylene and the said diolefin is isoprene.

11. A vulcanizate comprising 100 parts of a rubbery copolymer of isobutylene and isoprene, said copolymer containing from 0.5 to 10% of isoprene, and from 4 to 12 parts of 2,2'-methylene-bis-(4-nitro-6 - acetoxymethylphenol) as a curing agent.

12. A vulcanizate comprising 100 parts of a rubbery copolymer of isobutylene and isoprene, said copolymer containing from 0.5 to 10% of isoprene, from 4 to 12 parts of 2,6-bis-(acetoxymethyl)-4-nitrophenol as a curing agent, and from 0.5 to 5 parts of a heavy metal chloride as an accelerator.

References Cited in the file of this patent

UNITED STATES PATENTS

| 2,525,061 | Baldwin | Oct. 10, 1950 |
| 2,830,970 | Tawney | Apr. 15, 1958 |